(12) United States Patent  
Strong et al.

(10) Patent No.: US 12,510,184 B2  
(45) Date of Patent: Dec. 30, 2025

(54) SYSTEMS AND METHODS FOR LOCKING-IN AN OPERATIVE POSITION OF A VALVE

(71) Applicant: FISHER CONTROLS INTERNATIONAL LLC, Marshalltown, IA (US)

(72) Inventors: Eric Strong, Marshalltown, IA (US); Sean Raymond, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 38 days.

(21) Appl. No.: 18/176,386

(22) Filed: Feb. 28, 2023

(65) Prior Publication Data

US 2024/0288092 A1 Aug. 29, 2024

(51) Int. Cl.
*F16K 37/00* (2006.01)
(52) U.S. Cl.
CPC ................................ *F16K 37/0083* (2013.01)
(58) Field of Classification Search
CPC ............................ F16K 37/0083; F16K 31/126
See application file for complete search history.

(56) References Cited

U.S. PATENT DOCUMENTS

| | | | | |
|---|---|---|---|---|
| 4,869,102 A | * | 9/1989 | Hale | F16K 37/0083 |
| | | | | 702/41 |
| 8,517,335 B2 | * | 8/2013 | Tondolo | F15B 20/002 |
| | | | | 60/404 |
| 10,845,781 B2 | * | 11/2020 | Cartwright | G05B 19/042 |
| 11,002,380 B2 | * | 5/2021 | Miller | G05B 19/0428 |
| 11,098,822 B2 | * | 8/2021 | Götz | F16K 37/0008 |
| 11,174,965 B2 | * | 11/2021 | Huck | F15B 19/005 |

FOREIGN PATENT DOCUMENTS

| | | | | |
|---|---|---|---|---|
| CN | 111350870 A | * | 6/2020 | ........... F16K 31/122 |
| CN | 114992377 A | * | 9/2022 | .......... F16K 37/0083 |
| KR | 20130009396 A | * | 1/2013 | ............. F15B 13/043 |

OTHER PUBLICATIONS

KR 20130009396 Translation (Year: 2013).*
CN 111350870 Translation (Year: 2020).*
CN 114992377 Translation (Year: 2022).*
Mini MCR-SL-UI-REL, Configurable Threshold Value Switch, Feb. 2021, pp. 1-9.
Instruction Manual Supplement DVC6200 Digital Valve Controller D104490X012, Single Point Calibration Fisher™ Fieldvue™ DVC6200 HW2 Digital Valve Controller, Jan. 2020, pp. 1-6.
Instruction Manual DVC6200 Digital Valve Controller, "Fisher™ Fieldvue™ DVC6200 Digital Valve, D103605X012 Controller," Dec. 2022, pp. 1-108.
377 Trip Valve Product Bulletin D200318X012 62.3:377 Dec. 2021, Fisher™ 377 Trip Valve, pp. 1-10.
Quick Start Guide DVC6200 Digital Valve Controllers, D103556X012 Feb. 2022, "Fisher™ Fieldvue™ DVC6200 Series Digital Valve," Controllers, pp. 1-44.

* cited by examiner

*Primary Examiner* — Umashankar Venkatesan
(74) *Attorney, Agent, or Firm* — Mackey Law Firm PLLC

(57) ABSTRACT

A method of controlling a valve can include monitoring electrical power supplied to the valve and/or monitoring pneumatic pressure supplied to the valve. Upon failure of the electrical power and/or pneumatic pressure, the operative position of the valve can be held in its last position and/or moved to a fail-safe position. Whether the valve position is held, or moved to a fail-safe position, can be independent of, or dependent upon, the position of the valve and/or an error in position of the valve.

20 Claims, 6 Drawing Sheets

SYSTEMS AND METHODS FOR LOCKING-IN AN OPERATIVE POSITION OF A VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to control valves and more specifically relates to pneumatically operated control valves.

Description of the Related Art

Pneumatically operated control valves rely on pneumatic pressure to open, close or otherwise operate. Some pneumatically operated control valves can open to virtually any position, i.e., partially open, depending on the magnitude of the pneumatic pressure applied, such as to control flow through the process control valve. Some pneumatically operated control valves also receive an electrical signal as a control input indicative of a desired position of the process control valve. If the pneumatic pressure and/or the electrical signal to such a control valve fails, the process control valve can default to an open or closed position. In some cases, this can be undesirable. A need exists in the art for improved devices, systems and methods for pneumatically operated control valves.

BRIEF SUMMARY OF THE INVENTION

Applicants have created new and useful devices, systems and methods for pneumatically operated control valves. In at least one embodiment, a method of controlling a valve can include monitoring electrical power supplied to the valve, monitoring pneumatic pressure supplied to the valve, monitoring an operative position of the valve, or any combination thereof. In at least one embodiment, a method of controlling a valve can include holding the operative position of the valve upon failure of the electrical power supplied to the valve, such as when the operative position of the valve exceeds a threshold, and/or changing the operative position of the valve to a fail-safe position upon failure of the electrical power supplied to the valve, such as when the operative position of the valve does not exceed a threshold. In at least one embodiment, a method of controlling a valve can include holding the operative position of the valve upon failure of the pneumatic pressure supplied to the valve, such as when the operative position of the valve exceeds a threshold, and/or changing the operative position of the valve to the fail-safe position upon failure of the pneumatic pressure supplied to the valve, such as when the operative position of the valve does not exceed a threshold.

In at least one embodiment, the electrical power can be monitored independently of an electrical control signal to the valve. In at least one embodiment, the pneumatic pressure supplied to the valve can provide a motive force to select an operative position of the valve. In at least one embodiment, two or more thresholds, such as first, second, third or other thresholds, can be different from one another, as needed or desired in accordance with an implementation of the disclosure.

In at least one embodiment, a method of controlling a valve can include holding an operative position of the valve when the operative position of the valve differs in proportionality from an electrical control signal to the valve in excess of a threshold. In at least one embodiment, a method of controlling a valve can include changing an operative position of the valve to a fail-safe position when the operative position of the valve differs in proportionality from an electrical control signal to the valve in excess of a threshold.

In at least one embodiment, a method of controlling a valve can include monitoring electrical power supplied to the valve, monitoring pneumatic pressure supplied to the valve, holding an operative position of the valve upon failure of the electrical power supplied to the valve, or any combination thereof. In at least one embodiment, a method of controlling a valve can include holding an operative position of the valve upon failure of the pneumatic pressure supplied to the valve. In at least one embodiment, a method of controlling a valve can include changing the operative position of the valve to a fail-safe position upon failure of the pneumatic pressure supplied to the valve.

In at least one embodiment, the electrical power can be monitored independently of an electrical control signal to the valve. In at least one embodiment, the pneumatic pressure supplied to a valve can provide a motive force to select an operative position of the valve.

In at least one embodiment, a method of controlling a valve can include monitoring an operative position of the valve. In at least one embodiment, a method of controlling a valve can include holding the operative position of the valve upon failure of the pneumatic pressure supplied to the valve, when the operative position of the valve exceeds a threshold, and/or changing the operative position of the valve to the fail-safe position upon failure of the pneumatic pressure supplied to the valve, when the operative position of the valve does not exceed a threshold.

In at least one embodiment, a method of controlling a valve can include monitoring at least one control signal supplied to the valve, monitoring an operative position of the valve, holding the operative position of the valve upon failure of the at least one control signal supplied to the valve, when the operative position of the valve exceeds a first threshold, changing the operative position of the valve to a fail-safe position upon failure of the at least one control signal supplied to the valve, when the operative position of the valve does not exceed the first threshold, or any combination thereof. In at least one embodiment, the at least one control signal can include an electrical control signal to the valve and/or pneumatic pressure supplied to the valve, which can provide a motive force to select the operative position of the valve. In at least one embodiment, a method of controlling a valve can include holding the operative position of the valve when the operative position of the valve differs in proportionality from an electrical control signal to the valve in excess of a second threshold and/or changing the operative position of the valve to the fail-safe position when the operative position of the valve differs in proportionality from an electrical control signal to the valve in excess of the second threshold.

DETAILED DESCRIPTION OF THE INVENTION

Figure 1:
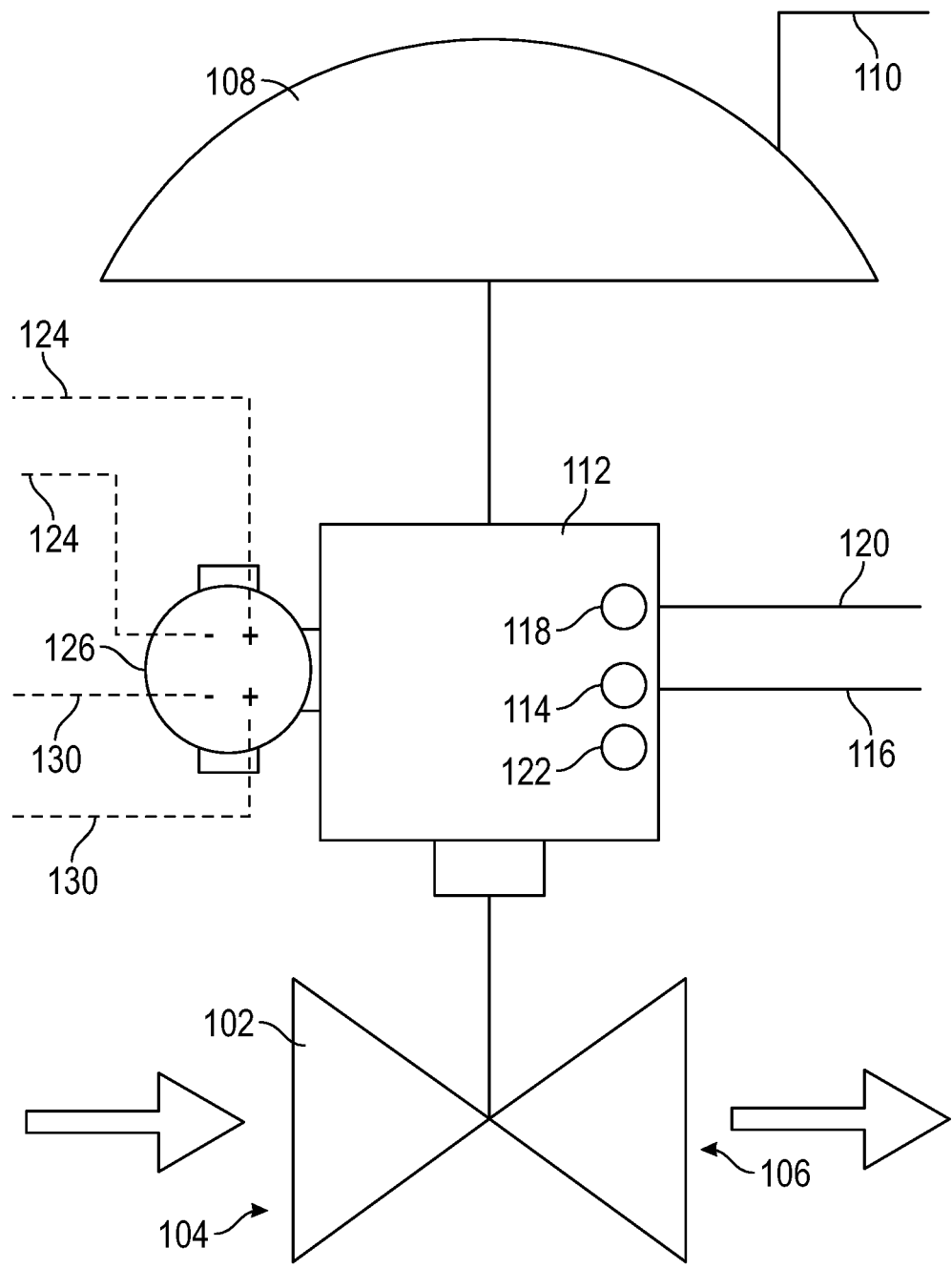
FIG. 1 is a schematic diagram of one of many embodiments of a pneumatically operated control valve according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Process flowcharts discussed herein illustrate the operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Figure 2:
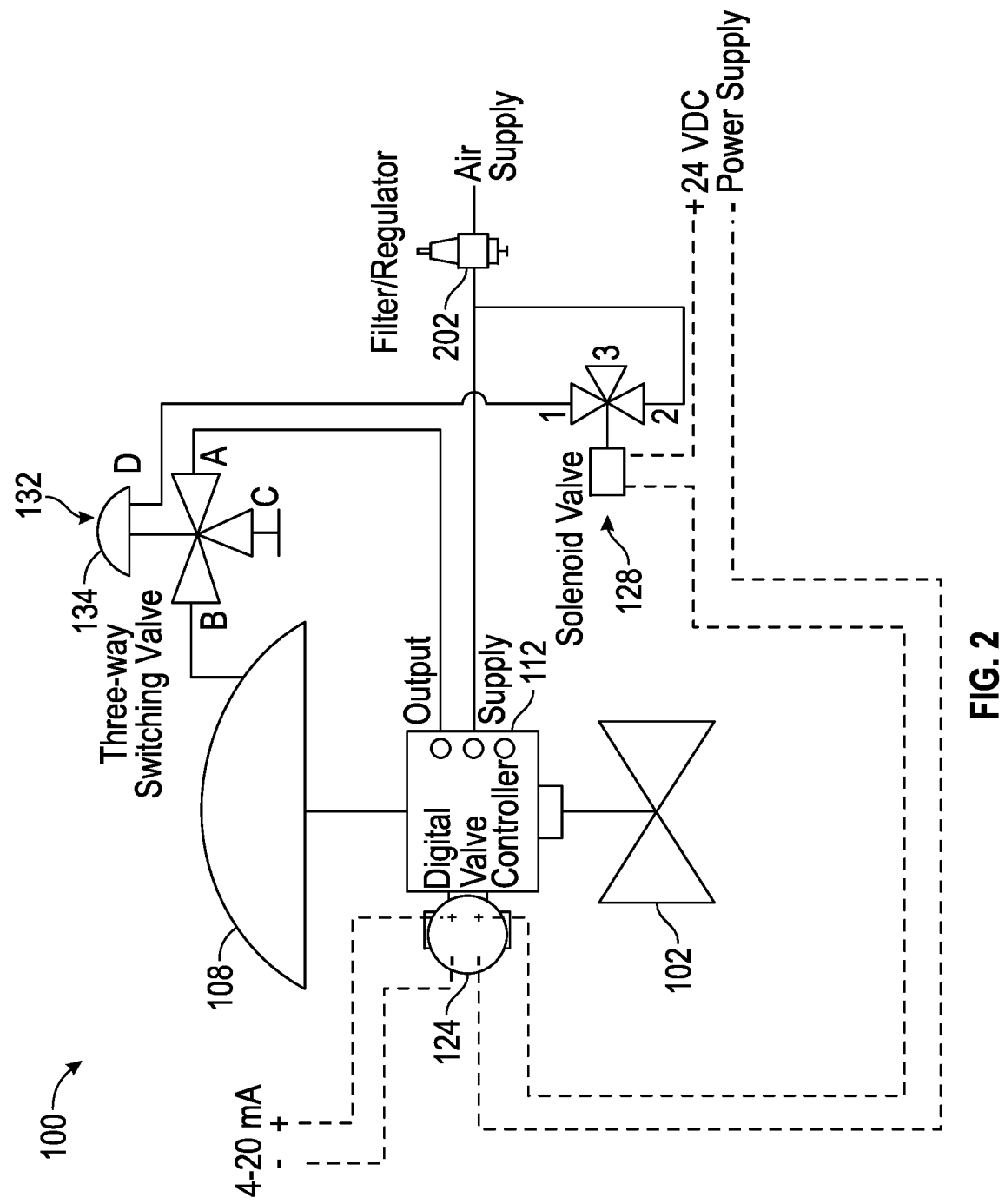
FIG. 2 is a schematic diagram of one of many embodiments of a pneumatically operated control valve assembly according to the disclosure.
Figure 3:
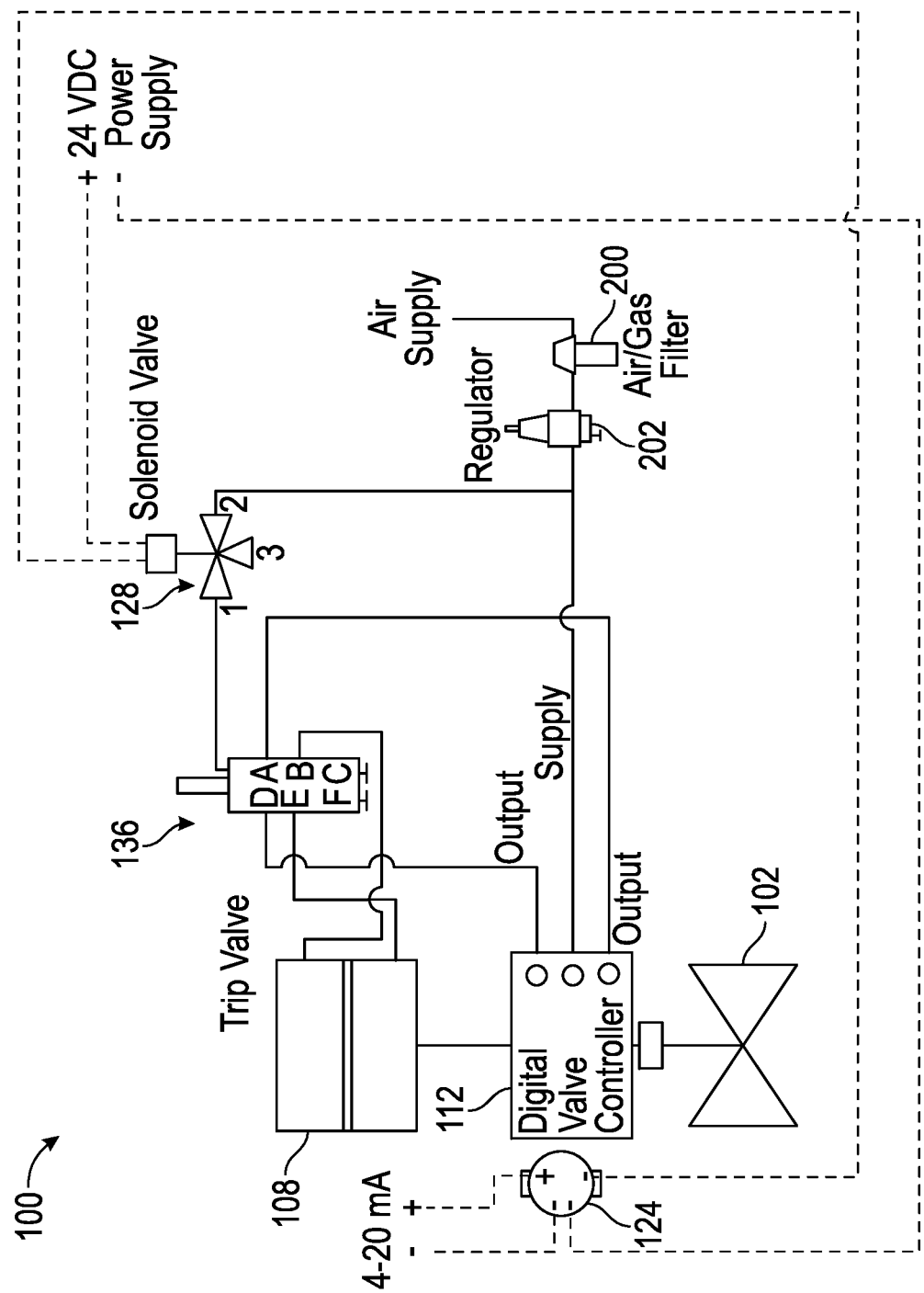
FIG. 3 is a schematic diagram of another of many embodiments of a pneumatically operated control valve assembly according to the disclosure.
Figure 4:
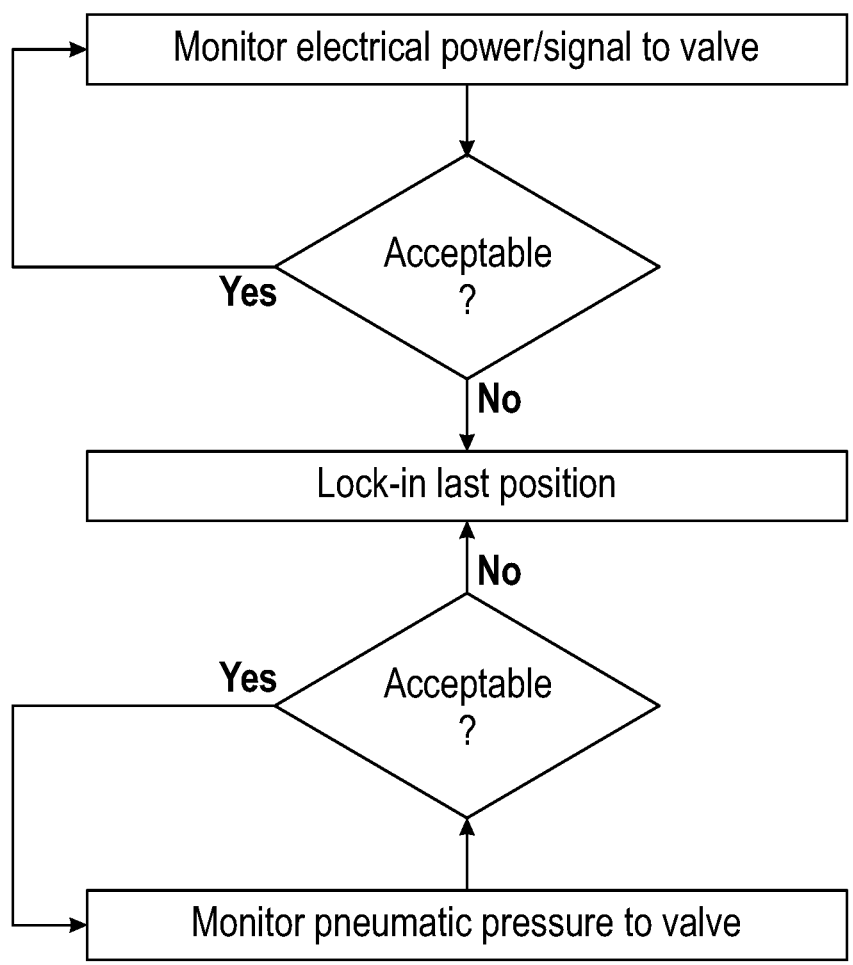
FIG. 4 is a flow chart illustrating one of many embodiments of a method of operating a control valve assembly according to the disclosure.
Figure 5:
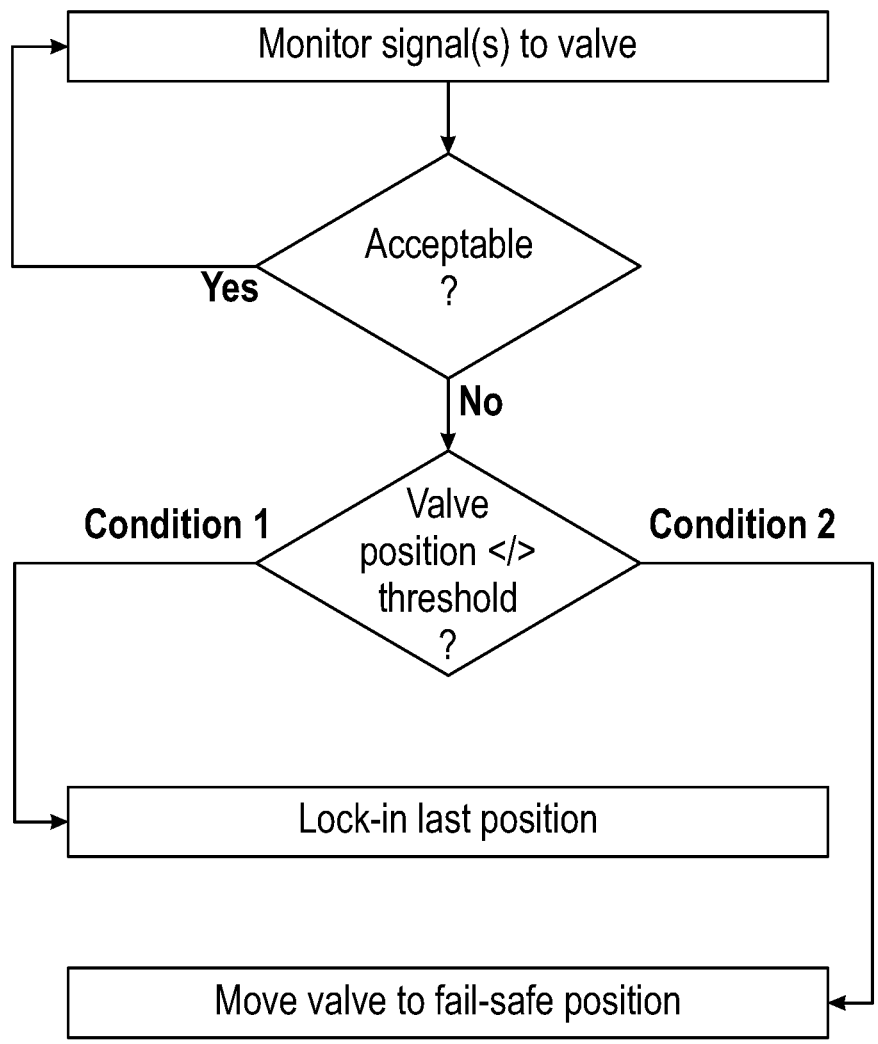
FIG. 5 is a flow chart illustrating another of many embodiments of a method of operating a control valve assembly according to the disclosure.
Figure 6:
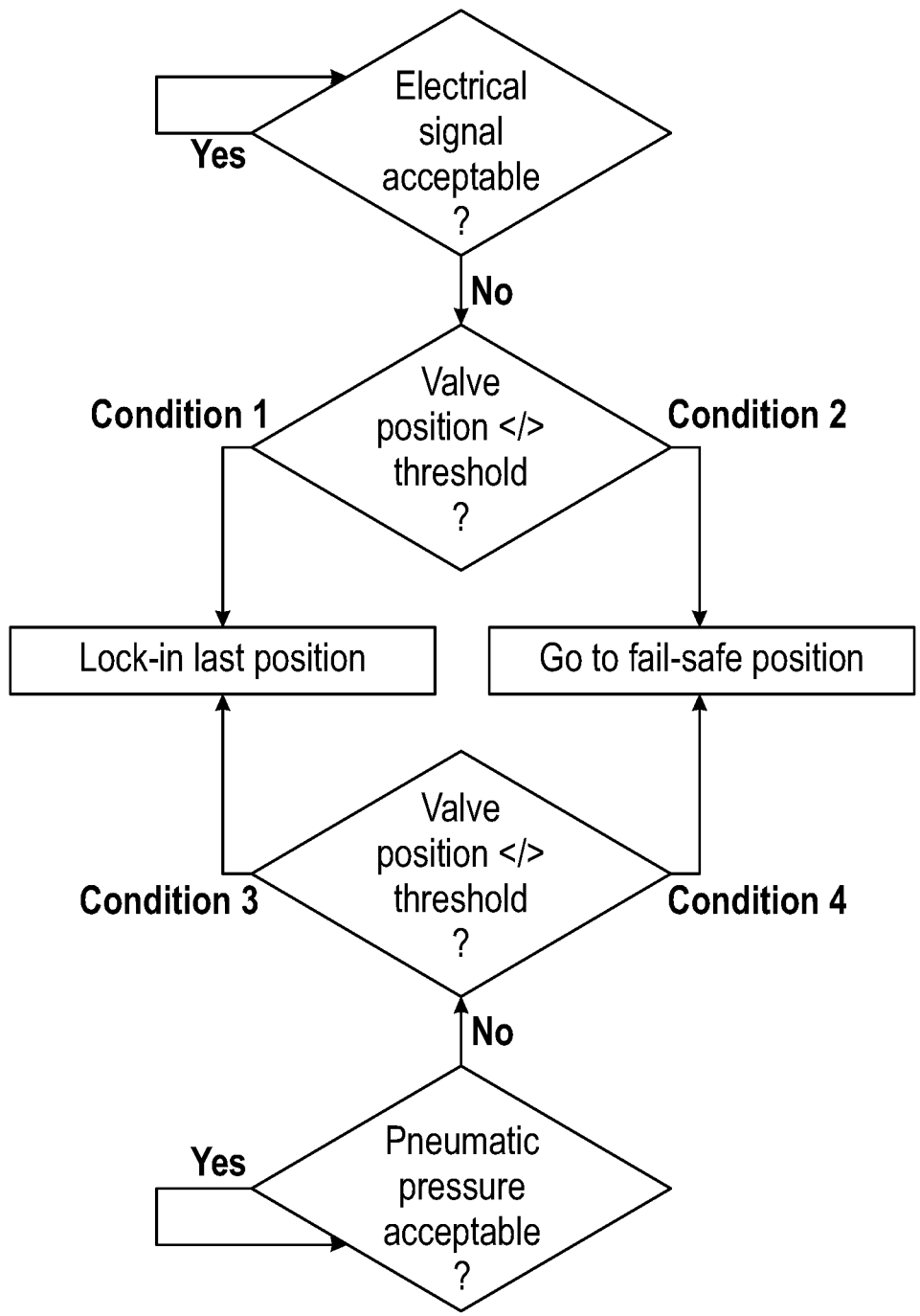
FIG. 6 is a flow chart illustrating yet another of many embodiments of a method of operating a control valve assembly according to the disclosure.

Applicants have created new and useful devices, systems and methods for pneumatically operated control valves. FIG. 1 is a schematic diagram of one of many embodiments of a pneumatically operated control valve according to the disclosure. FIG. 2 is a schematic diagram of one of many embodiments of a pneumatically operated control valve assembly according to the disclosure. FIG. 3 is a schematic diagram of another of many embodiments of a pneumatically operated control valve assembly according to the disclosure. FIG. 4 is a flow chart illustrating one of many embodiments of a method of operating a control valve assembly according to the disclosure. FIG. 5 is a flow chart illustrating another of many embodiments of a method of operating a control valve assembly according to the disclosure. FIG. 6 is a flow chart illustrating yet another of many embodiments of a method of operating a control valve assembly according to the disclosure. FIGS. 1-6 are described in conjunction with one another.

In at least one embodiment, a pneumatically operated control valve assembly 100 can include a process control valve 102 having an input port 104 and an output port 104 for controlling a process flow therethrough. In at least one embodiment, the process control valve 102 can be mechanically operated using pneumatic pressure, such as compressed air or other gas. For example, in at least one embodiment, the process control valve 102 can be operated using a pneumatic diaphragm 108 opposing a biasing force, such as a spring, to control an operative position of the valve 102. In at least one embodiment, the biasing force can bias the valve 102 towards a fully open position, such that the valve moves to the fully open position upon low, or no, pneumatic pressure. In at least one embodiment, the biasing force can bias the valve 102 towards a fully closed position, such that the valve moves to the fully closed position upon low, or no, pneumatic pressure.

In at least one embodiment, pneumatic pressure can be supplied to the diaphragm 108 through a pneumatic control line 110 and/or an electronic valve controller 112. For example, in at least one embodiment, the controller 112 can have a pneumatic input port 114, through which it can receive clean, compressed air or other gas from a supply line 116. In at least one embodiment, the controller 112 can provide select pneumatic pressure to the diaphragm 108 through an output port 118, and/or one or more pneumatic control lines 110, 120.

In at least one embodiment, the controller 112 can receive the pneumatic pressure at a system pressure from a source, such as through a filter 200 and/or a regulator 202. In at least one embodiment, the controller 112 can provide pressure to the diaphragm 108 at a control pressure, which can be less than the system pressure. For example, the control pressure can be proportional to a desired operative position of the valve 102.

In at least one embodiment, the controller 112 can include a secondary output port 122, which may be used to provide counter pressure to the diaphragm 108 (or a piston assembly), such as in place of the spring and/or biasing force. In at least one embodiment, the controller 112 can be a Fisher™ FIELDVUE™ DVC6200 Digital Valve Controller, or the like.

In at least one embodiment, the controller 112 can include an electrical junction box 124, through which it can receive an electrical control signal, such as through a current loop 126. In at least one embodiment, the control signal can be a digital signal, a voltage signal, a current signal, or any combination thereof. In at least one embodiment, the controller 112 can receive a 4 mA to 20 mA control signal, which can be proportional to a desired operative position of the valve 102. For example, a 4 mA control signal can indicate a closed position of the valve 102 is desired and a 20 mA control signal can indicate a closed position of the valve 102, or vice versa. In at least one embodiment, the control pressure provided by the controller 112 can be proportional, or counter-proportional, to the control signal, which can be received from an external supervisory control system.

In at least one embodiment, the controller 112 can monitor the control signal and operate an output switch depending on the acceptability of the control signal. For example, in at least one embodiment, the controller 112 can keep the output switch closed when the control signal is acceptable, and open the output switch when the control signal is unacceptable, or vice versa.

In at least one embodiment, the controller 112 can monitor the operative position of the valve 102 and/or compare that operative position with the control signal. In at least one embodiment, the controller 112 can operate an output switch based upon that comparison. For example, in at least one embodiment, the controller 112 can keep the output switch closed when the operative position of the valve 102 is within a threshold difference of the desired position indicated by the control signal, i.e., the operative position of the valve 102 closely matches the desired position, and open the output switch otherwise, or vice versa.

In at least one embodiment, a pneumatically operated control valve assembly 100 can include a solenoid valve 128. In at least one embodiment, the solenoid valve 128 can be wired, such as in a series loop 130, to the output switch of the controller 112, such as through the junction box 124, to a power source, or any combination thereof. In at least one embodiment, power, from the power source, can energize the solenoid valve 128 through the output switch. For example, in at least one embodiment, when the control signal is acceptable and/or the controller 112 holds the output switch closed, the solenoid valve 128 can be energized through the output switch. In at least one embodiment, when the control signal is unacceptable and/or the controller 112 opens the output switch, the solenoid valve 128 can be de-energized.

In at least one embodiment, a pneumatically operated control valve assembly 100 can include a pneumatic control valve 132. In at least one embodiment, the pneumatic control valve 132 can be plumbed between the output port 118 of the controller 112, or pneumatic control line 120, and the diaphragm 108 of the valve 102, or pneumatic control line 110. In at least one embodiment, the solenoid valve 128 can be plumbed between an operator 134, such as a diaphragm or piston, the pneumatic control valve 132 and the system pressure source, or regulator 202.

For example, in at least one embodiment, when the control signal is acceptable and/or the controller 112 holds the output switch closed, the solenoid valve 128 can pass system pressure to the operator 134 of the pneumatic control valve 132, which in turn can pass the control pressure from the controller 112 to the diaphragm 108 of the valve 102, thereby allowing the controller 112 to control the operative position of the valve 102. In at least one embodiment, when the control signal is unacceptable and/or the controller 112 opens the output switch, the solenoid valve 128 can vent system pressure from the operator 134 of the pneumatic control valve 132, which in turn can block the control pressure from the controller 112 to the diaphragm 108 of the valve 102, thereby locking-in the operative position of the valve 102. For example, an exhaust port of the pneumatic control valve 132 can be plugged, such that when system pressure is vented from the operator 134 of the pneumatic control valve 132, the pressure at the diaphragm 108 of the valve 102 is locked, regardless of any later changes in the control pressure from the controller 112. However, in at least one embodiment, when the control signal returns to acceptable and/or the controller 112 closes the output switch, the solenoid valve 128 can again pass system pressure to the operator 134 of the pneumatic control valve 132, which in turn can pass the control pressure from the controller 112 to the diaphragm 108 of the valve 102, thereby once again allowing the controller 112 to control the operative position of the valve 102.

Where the valve 102 uses a two-way acting diaphragm 108, or a piston operator, such as where the biasing force, or spring, is not used to operate the valve 102, the controller 112 may provide two different control pressures to the diaphragm or piston operator 108, such as through output port 118 and/or secondary output port 122. In at least one embodiment, a pneumatically operated control valve assembly 100 can include a pneumatic control valve 132 for each control pressure, plumbed between respective output ports 118, 122 and the diaphragm or piston operator 108.

In at least one embodiment, a pneumatically operated control valve assembly 100 can include a trip valve 136. In at least one embodiment, the trip valve 136 can be plumbed between the output port 118 of the controller 112 and one side of the diaphragm or piston operator 108 for the valve 102. In at least one embodiment, the trip valve 136 can be plumbed between the secondary output port 122 of the controller 112 and another side of the diaphragm or piston operator 108 for the valve 102. In at least one embodiment, the solenoid valve 128 can be plumbed between a sensing port of the trip valve 136 and the system pressure source, or regulator 202.

For example, in at least one embodiment, when the control signal is acceptable and/or the controller 112 holds the output switch closed, the solenoid valve 128 can pass system pressure to the sensing port of the trip valve 136, which in turn can pass the control pressures from the output ports 118, 122 of the controller 112 to the diaphragm 108 of the valve 102, thereby allowing the controller 112 to control the operative position of the valve 102. In at least one embodiment, when the control signal is unacceptable and/or the controller 112 opens the output switch, the solenoid valve 128 can vent system pressure from the sensing port of the trip valve 136, which in turn can block the control pressures from the controller 112 to the diaphragm 108 of the valve 102, thereby locking-in the operative position of the valve 102. For example, exhaust ports of the trip valve 136 can be plugged, such that when system pressure is vented from the sensing port of the trip valve 136, the pressures at the diaphragm 108 of the valve 102 is locked, regardless of any later changes in the control pressures from the controller 112. However, in at least one embodiment, when the control signal returns to acceptable and/or the controller 112 closes the output switch, the solenoid valve 128 can again pass system pressure to the sensing port of the trip valve 136, which in turn can pass the control pressures from the controller 112 to the diaphragm 108 of the valve 102, thereby once again allowing the controller 112 to control the operative position of the valve 102.

In at least one embodiment, the trip valve 136 can be configured to pass or block the control pressures from the controller 112 to the diaphragm 108 of the valve 102, based on the system pressure received at its sensing port. For example, in at least one embodiment, when the system pressure received the sensing port of the trip valve 136 is sufficient, or otherwise acceptable, a first input port of the trip valve 136, such as plumbed to the output port 118 of the controller 112, can pass the control pressure from the output port 118 of the controller 112 to one side of the diaphragm or piston operator 108 for the valve 102 through a first output port. In at least one embodiment, when the system pressure received the sensing port of the trip valve 136 is sufficient, or otherwise acceptable, a second input port of the trip valve 136, such as plumbed to the secondary output port 122 of the controller 112, can pass the control pressure from the secondary output port 122 of the controller 112 to another side of the diaphragm or piston operator 108 for the valve 102 through a second output port. In at least one embodiment, when the system pressure received the sensing port of the trip valve 136 is insufficient, or otherwise unacceptable, the trip valve 136 can shift, locking-in the operative position of the valve 102, regardless of any later changes in the control pressures from the controller 112, by blocking communication between its input ports and output ports. In at least one embodiment, the trip valve 136 can be or include a Fisher™ 377 Trip Valve, or the like.

In at least one embodiment, a method of controlling a valve 102 can include monitoring electrical power supplied to the valve 100, 102, monitoring pneumatic pressure supplied to the valve 100, 102, monitoring an operative position of the valve 102, or any combination thereof. For example, as described above, the controller 112 can monitor the control signal and/or the operative position of the valve 102. In at least one embodiment, the controller 112 and/or the trip valve 136 can monitor the pneumatic pressure supplied to the valve 112 and/or the controller 112.

In at least one embodiment, a method of controlling a valve 102 can include holding the operative position of the valve 102 upon failure of the electrical power supplied to the valve 100, 102, when the operative position of the valve 102 exceeds a first threshold, and/or changing the operative position of the valve 102 to a fail-safe position upon failure of the electrical power supplied to the valve 100, 102, when the operative position of the valve 102 does not exceed the first threshold. For example, as described above, the controller 112 can cause solenoid valve 128 can bleed off system pressure from the pneumatic control valve 132 or the trip valve 136, thereby locking-in control pressure(s) within the diaphragm or piston operator 108, thereby locking-in the operative position of the valve 102. As also described above, the controller 112 can command the operative position of the valve 102, and monitor the operative position of the valve 102, and it can therefore command the valve 102 to go to the fail-safe position or operate the output switch to lock-in the operative position of the valve 102, depending on the operative position of the valve 102 upon receiving an unacceptable control signal.

In at least one embodiment, a method of controlling a valve 102 can include holding the operative position of the valve 102 upon failure of the pneumatic pressure supplied to the valve, when the operative position of the valve exceeds a second threshold, and/or changing the operative position of the valve to the fail-safe position upon failure of the pneumatic pressure supplied to the valve, when the operative position of the valve does not exceed the second threshold. For example, as described above, the trip valve 136 can be configured to lock-in control pressure(s) within the diaphragm or piston operator 108, thereby locking-in the operative position of the valve 102. As also described above, the controller 112 can monitor the system pressure it receives at its input port 114 and operate its output switch, thereby locking-in the operative position of the valve 102, when the system pressure it receives at its input port 114 is too high, too low, or otherwise unacceptable. As also described above, the controller 112 can monitor the system pressure it receives at its input port 114 and drive the operative position of the valve 102 to the fail-safe position, when the system pressure it receives at its input port 114 is too high, too low, or otherwise unacceptable.

In at least one embodiment, the electrical power can be monitored independently of an electrical control signal to the valve assembly 100. In at least one embodiment, the electrical power monitored can be the control signal received at the valve assembly 100, or can be dependent thereon.

In at least one embodiment, the pneumatic pressure supplied to the valve assembly 100 can provide a motive force to select the operative position of the valve 102. For example, as discussed above, the controller 112 can receive the system pressure and supply the control pressure(s) therefrom, which can provide force on one side and/or another of the diaphragm or piston operator 108 to open or close the valve 102, or otherwise change the operative position of the valve 102.

The thresholds discussed herein can be different from one another, depending on the operative position of the valve 102, whether the failure is of the electrical control signal, the pneumatic pressure, or both, or the error between the desired position of the valve 102 and the operative position of the valve 102. The thresholds discussed herein can also be in terms of minimums, such that exceeding a minimum threshold means going below that minimum threshold, and/or maximums, such that exceeding a maximum threshold means going above that maximum threshold. The thresholds discussed herein can be or include any threshold(s) as may be required or desired in accordance with an implementation of the disclosure.

In at least one embodiment, a method of controlling a valve can include holding the operative position of the valve when the operative position of the valve differs in proportionality from an electrical control signal to the valve in excess of a third threshold. In at least one embodiment, a method of controlling a valve can include changing the operative position of the valve to the fail-safe position when the operative position of the valve differs in proportionality from an electrical control signal to the valve in excess of a third threshold. For example, as described above, the controller 112 can command the operative position of the valve 102, and monitor the operative position of the valve 102, and it can therefore command the valve 102 to go to the fail-safe position or operate the output switch to lock-in the operative position of the valve 102, depending on a difference in the operative position of the valve 102, the desired position of the valve 102, the control pressure(s), the control signal, or any combination thereof. In at least one embodiment, the difference can be in absolute terms, in proportion, linear, logarithmic, or any combination thereof.

In at least one embodiment, a method of controlling a valve 102 can include monitoring electrical power supplied to the valve 100, 102, monitoring pneumatic pressure supplied to the valve 100, 102, holding the operative position of the valve 102 upon failure of the electrical power supplied to the valve 102, or any combination thereof. In at least one embodiment, a method of controlling a valve 102 can include holding the operative position of the valve 102 upon failure of the pneumatic pressure supplied to the valve 100, 102. In at least one embodiment, a method of controlling a valve 102 can include changing the operative position of the valve 102 to the fail-safe position upon failure of the pneumatic pressure supplied to the valve 100, 102. The fail-safe position of the valve 102, as discussed herein, may be fully open, fully closed, or anywhere in between, depending on the valve 100, 102 and/or the process being controlled.

In at least one embodiment, a method of controlling a valve 102 can include monitoring an operative position of the valve 102. In at least one embodiment, a method of controlling a valve 102 can include holding the operative position of the valve 102 upon failure of the pneumatic pressure supplied to the valve 100, 102, when the operative position of the valve 102 exceeds a threshold, and/or changing the operative position of the valve 102 to the fail-safe position upon failure of the pneumatic pressure supplied to the valve 100, 102, when the operative position of the valve 102 does not exceed a threshold.

In at least one embodiment, a method of controlling a valve 102 can include monitoring at least one control signal supplied to the valve 100, 102, monitoring an operative position of the valve 102, holding the operative position of the valve 102 upon failure of the at least one control signal supplied to the valve 100, 102, when the operative position of the valve 102 exceeds a first threshold, changing the operative position of the valve 102 to a fail-safe position upon failure of the at least one control signal supplied to the valve 100, 102, when the operative position of the valve 102 does not exceed the first threshold, or any combination thereof. In at least one embodiment, the at least one control signal includes an electrical control signal to the valve 100, 102 and/or pneumatic pressure supplied to the valve 100, 102, which can provide a motive force to select the operative position of the valve 102. In at least one embodiment, a method of controlling a valve 102 can include holding the operative position of the valve 102 when the operative position of the valve 102 differs in proportionality from an electrical control signal to the valve 100, 102 in excess of a second threshold and/or changing the operative position of the valve 102 to the fail-safe position when the operative position of the valve 102 differs in proportionality from an electrical control signal to the valve 100, 102 in excess of the second threshold.

In at least one embodiment, a method of controlling a valve can include monitoring electrical power supplied to the valve, monitoring pneumatic pressure supplied to the valve, monitoring an operative position of the valve, or any combination thereof. In at least one embodiment, a method of controlling a valve can include holding the operative position of the valve upon failure of the electrical power supplied to the valve, when the operative position of the valve exceeds a first threshold, and/or changing the operative position of the valve to a fail-safe position upon failure of the electrical power supplied to the valve, when the operative position of the valve does not exceed the first threshold. In at least one embodiment, a method of controlling a valve can include holding the operative position of the valve upon failure of the pneumatic pressure supplied to the valve, when the operative position of the valve exceeds a second threshold, and/or changing the operative position of the valve to the fail-safe position upon failure of the pneumatic pressure supplied to the valve, when the operative position of the valve does not exceed the second threshold.

In at least one embodiment, the electrical power can be monitored independently of an electrical control signal to the valve. In at least one embodiment, the pneumatic pressure supplied to the valve can provide a motive force to select the operative position of the valve. In at least one embodiment, the first threshold can be different from the second threshold.

In at least one embodiment, a method of controlling a valve can include holding the operative position of the valve when the operative position of the valve differs in proportionality from an electrical control signal to the valve in excess of a third threshold. In at least one embodiment, a method of controlling a valve can include changing the operative position of the valve to the fail-safe position when the operative position of the valve differs in proportionality from an electrical control signal to the valve in excess of a third threshold.

In at least one embodiment, a method of controlling a valve can include monitoring electrical power supplied to the valve, monitoring pneumatic pressure supplied to the valve, holding the operative position of the valve upon failure of the electrical power supplied to the valve, or any combination thereof. In at least one embodiment, a method of controlling a valve can include holding the operative position of the valve upon failure of the pneumatic pressure supplied to the valve. In at least one embodiment, a method of controlling a valve can include changing the operative position of the valve to the fail-safe position upon failure of the pneumatic pressure supplied to the valve.

In at least one embodiment, the electrical power can be monitored independently of an electrical control signal to the valve. In at least one embodiment, the pneumatic pressure supplied to the valve can provide a motive force to select the operative position of the valve.

In at least one embodiment, a method of controlling a valve can include monitoring an operative position of the valve. In at least one embodiment, a method of controlling a valve can include holding the operative position of the valve upon failure of the pneumatic pressure supplied to the valve, when the operative position of the valve exceeds a threshold, and/or changing the operative position of the valve to the fail-safe position upon failure of the pneumatic pressure supplied to the valve, when the operative position of the valve does not exceed a threshold.

In at least one embodiment, a method of controlling a valve can include monitoring at least one control signal supplied to the valve, monitoring an operative position of the valve, holding the operative position of the valve upon failure of the at least one control signal supplied to the valve, when the operative position of the valve exceeds a first threshold, changing the operative position of the valve to a fail-safe position upon failure of the at least one control signal supplied to the valve, when the operative position of the valve does not exceed the first threshold, or any combination thereof. In at least one embodiment, the at least one control signal includes an electrical control signal to the valve and/or pneumatic pressure supplied to the valve, which can provide a motive force to select the operative position of the valve. In at least one embodiment, a method of controlling a valve can include holding the operative position of the valve when the operative position of the valve differs in proportionality from an electrical control signal to the valve in excess of a second threshold and/or changing the operative position of the valve to the fail-safe position when the operative position of the valve differs in proportionality from an electrical control signal to the valve in excess of the second threshold.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A method of controlling a valve, the method comprising:
   monitoring electrical power supplied to the valve;
   monitoring pneumatic pressure supplied to the valve;
   monitoring an operative position of the valve; and
   holding the operative position of the valve upon failure of the electrical power supplied to the valve, when the operative position of the valve exceeds a first threshold;
   changing the operative position of the valve to a fail-safe position upon failure of the electrical power supplied to the valve, when the operative position of the valve does not exceed the first threshold;
   holding the operative position of the valve upon failure of the pneumatic pressure supplied to the valve, when the operative position of the valve exceeds a second threshold; and
   changing the operative position of the valve to the fail-safe position upon failure of the pneumatic pressure supplied to the valve, when the operative position of the valve does not exceed the second threshold.

2. The method of claim 1, wherein the electrical power is monitored independently of an electrical control signal to the valve.

3. The method of claim 1, wherein the pneumatic pressure supplied to the valve provides a motive force to select the operative position of the valve.

4. The method of claim 1, further comprising holding the operative position of the valve when the operative position of the valve differs in proportionality from an electrical control signal to the valve in excess of a third threshold.

5. The method of claim 1, further comprising changing the operative position of the valve to the fail-safe position when the operative position of the valve differs in proportionality from an electrical control signal to the valve in excess of a third threshold.

6. The method of claim 1, wherein the first threshold is different from the second threshold.

7. A method of controlling a valve, the method comprising:
   monitoring electrical power supplied to the valve;
   monitoring pneumatic pressure supplied to the valve;
   holding an operative position of the valve upon failure of the electrical power supplied to the valve; and
   changing the operative position of the valve to a fail-safe position upon failure of the pneumatic pressure supplied to the valve.

8. The method of claim 7, wherein the pneumatic pressure supplied to the valve provides a motive force to select the operative position of the valve.

9. The method of claim 7, further comprising holding the operative position of the valve upon failure of the pneumatic pressure supplied to the valve.

10. The method of claim 7, further comprising monitoring an operative position of the valve.

11. The method of claim 10, further comprising holding the operative position of the valve upon failure of the pneumatic pressure supplied to the valve, when the operative position of the valve exceeds a threshold.

12. The method of claim 10, further comprising changing the operative position of the valve to a fail-safe position upon failure of the pneumatic pressure supplied to the valve, when the operative position of the valve does not exceed a threshold.

13. The method of claim 7, wherein the electrical power is monitored independently of an electrical control signal to the valve.

14. A method of controlling a valve, the method comprising:
   monitoring at least one control signal supplied to the valve;
   monitoring an operative position of the valve; and
   holding the operative position of the valve upon failure of the at least one control signal supplied to the valve, when the operative position of the valve exceeds a first threshold; and
   changing the operative position of the valve to a fail-safe position upon failure of the at least one control signal supplied to the valve, when the operative position of the valve does not exceed the first threshold.

15. The method of claim 14, wherein the at least one control signal includes an electrical control signal to the valve.

16. The method of claim 14, wherein the at least one control signal includes pneumatic pressure supplied to the valve and which provides a motive force to select the operative position of the valve.

17. The method of claim 14, wherein the at least one control signal includes at least one of an electrical control signal to the valve, pneumatic pressure supplied to the valve for providing a motive force to select the operative position of the valve, and a combination thereof.

18. The method of claim 14, further comprising holding the operative position of the valve when the operative position of the valve differs in proportionality from an electrical control signal to the valve in excess of a third threshold.

19. The method of claim 14, further comprising changing the operative position of the valve to the fail-safe position when the operative position of the valve differs in proportionality from an electrical control signal to the valve in excess of a third threshold.

20. A method of controlling a valve, the method comprising:
  monitoring at least one signal supplied to the valve;
  monitoring an operative position of the valve;
  detecting a failure of the at least one signal supplied to the valve; and
  upon detecting the failure,
    comparing the operative position of the valve with a threshold;
    holding the operative position of the valve if the operative position of the valve exceeds the threshold;
    changing the operative position of the valve to a fail-safe position if the operative position of the valve does not exceed the threshold.

* * * * *